(12) United States Patent
Ito et al.

(10) Patent No.: US 10,469,727 B2
(45) Date of Patent: Nov. 5, 2019

(54) IMAGING APPARATUS, IMAGING METHOD, AND IMAGING SYSTEM

(71) Applicant: SONY CORPORATION, Tokyo (JP)

(72) Inventors: Yujiro Ito, Kanagawa (JP); Masatoshi Ootani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 80 days.

(21) Appl. No.: 15/117,505

(22) PCT Filed: Jan. 8, 2015

(86) PCT No.: PCT/JP2015/000062
§ 371 (c)(1),
(2) Date: Aug. 9, 2016

(87) PCT Pub. No.: WO2015/125405
PCT Pub. Date: Aug. 27, 2015

(65) Prior Publication Data
US 2016/0353003 A1    Dec. 1, 2016

(30) Foreign Application Priority Data

Feb. 19, 2014    (JP) .................................. 2014-029440

(51) Int. Cl.
*H04N 5/232*    (2006.01)
*H04N 9/04*    (2006.01)
(Continued)

(52) U.S. Cl.
CPC ..... *H04N 5/23206* (2013.01); *H04L 63/0428* (2013.01); *H04L 69/04* (2013.01);
(Continued)

(58) Field of Classification Search
CPC .... H04N 5/23206; H04N 5/378; H04N 9/045; H04L 63/0428; H04L 69/04
See application file for complete search history.

(56) References Cited

U.S. PATENT DOCUMENTS 9,608,809 B1 * 3/2017 Ghetti ..................... H04L 9/083
2002/0191082 A1 12/2002 Fujino et al.
(Continued)

FOREIGN PATENT DOCUMENTS

CN    101031050 A    9/2007
JP    2004-147104 A    5/2004
(Continued)

OTHER PUBLICATIONS

Extended European Search Report of EP Patent Application No. 15751540.4, dated Jun. 26, 2017, 07 pages.
(Continued)

*Primary Examiner* — Tsion B Owens
(74) *Attorney, Agent, or Firm* — Chip Law Group (57) ABSTRACT

This imaging apparatus includes: an imaging element for a color; a lens that forms an image of image light on an imaging surface of the imaging element; an A/D converter that converts an analog signal for each color, which is output by the imaging element, into a digital signal to generate raw data; a transmission processor that generates an IP packet storing the raw data generated by the A/D converter; and a network interface that transmits the generated IP packet to a server capable of performing development processing of the raw data, through a network.

10 Claims, 13 Drawing Sheets

(51) Int. Cl.
*H04N 5/378* (2011.01)
*H04L 29/06* (2006.01)
(52) U.S. Cl.
CPC ............ *H04N 5/232* (2013.01); *H04N 5/378* (2013.01); *H04N 9/045* (2013.01)

(56) References Cited

U.S. PATENT DOCUMENTS

| | | | |
|---|---|---|---|
| 2003/0026256 A1* | 2/2003 | Jinzaki | H04L 12/1881 370/392 |
| 2007/0209056 A1* | 9/2007 | Mayuzumi | H04N 1/00127 725/105 |
| 2011/0242370 A1 | 10/2011 | Endo | |
| 2013/0321458 A1* | 12/2013 | Miserendino | H04L 41/0883 345/629 |
| 2014/0177929 A1* | 6/2014 | Erhart | G06F 21/32 382/124 |

FOREIGN PATENT DOCUMENTS

| | | | | |
|---|---|---|---|---|
| JP | 2004-147262 A | | 5/2004 | |
| JP | 2004147104 | * | 5/2004 | |
| JP | 2007-142551 A | | 6/2007 | |
| JP | 2008-048050 A | | 2/2008 | |
| JP | 2008048050 | * | 2/2008 | |
| JP | 2008048050 | * | 8/2008 | ............... H04L 9/14 |
| JP | 2008-236396 A | | 10/2008 | |
| JP | 2008236396 A | * | 10/2008 | |
| JP | 2009-044256 A | | 2/2009 | |
| JP | 2011-216948 A | | 10/2011 | |
| JP | 2012-005056 A | | 1/2012 | |
| JP | 2012-256118 A | | 12/2012 | |

OTHER PUBLICATIONS

International Search report on patentability received for PCT Application No. PCT/JP2015/000062, dated Apr. 14, 2015, 5 pages of report including 2 pages of English translation.
Written Opinion received for PCT Application No. PCT/JP2015/000062, dated Apr. 14, 2015, 10 pages of report including 6 pages of English translation.
International preliminary report on patentability for PCT Application No. PCT/JP2015/000062, dated Aug. 23, 2016, 5 pages.
Office Action for CN Patent Application No. 201580008060.0, dated Sep. 26, 2018, 08 pages of Office Action and 12 pages of English Translation.
Office Action for JP Patent Application No. 2016-503954, dated Jan. 8, 2019, 05 pages of Office Action and 03 pages of English Translation.
Office Action for CN Patent Application No. 201580008060.0, dated Jun. 5, 2019, 7 pages of Office Action and 11 pages of English Translation.
Office Action for JP Patent Application No. 2016-503954, dated Aug. 6, 2019, 5 pages of Office Action and 4 pages of English Translation.

* cited by examiner

IMAGING APPARATUS, IMAGING METHOD, AND IMAGING SYSTEM

CROSS REFERENCE TO RELATED APPLICATIONS

This application is a U.S. National Phase of International Patent Application No. PCT/JP2015/000062 filed on Jan. 8, 2015, which claims priority benefit of Japanese Patent Application No. JP 2014-029440 filed in the Japan Patent Office on Feb. 19, 2014. Each of the above-referenced applications is hereby incorporated herein by reference in its entirety.

TECHNICAL FIELD

The present technology relates to an imaging apparatus, an imaging method, and an imaging system by which an object can be imaged with an imaging element.

BACKGROUND ART

In recent years, the number of pixels and frame rate of cameras for business use have increased. Therefore, a load on a controller of a camera tends to increase more and more.

In order to reduce the load on the controller of the camera and minimize the camera, the following system is known. Specifically, in the system, processing such as RGB conversion, color distortion correction, image adjustment, and gamma correction with respect to raw data generated by the imaging element of the camera is performed by a development unit connected to the camera via an optical cable (e.g., see Patent Document 1).

Patent Document 1: Japanese Patent Application Laid-open No. 2011-216948

SUMMARY OF INVENTION

Problem to be solved by the Invention

It is an object of the present technology to provide an imaging apparatus, an imaging method, and an imaging system by which a load on a controller can be reduced and downsizing and power reduction can be achieved. It is an object is to provide.

Means for solving the Problem

In order to solve the above problem, an imaging apparatus according to the present technology, includes: an imaging element for a color; an A/D converter that converts an analog signal for each color, which is output by the imaging element, into a digital signal to generate raw data; a transmission processor that generates an IP packet storing the raw data generated by the A/D converter; and a network interface that transmits the generated IP packet to a server capable of performing development processing of the raw data, through a network.

The imaging apparatus may further include a buffer that buffers the raw data generated by the A/D converter.

The imaging apparatus may further include: a busy information acquisition unit that acquires busy information indicating a busy state of the server, which is transmitted from the server; and a controller that changes, on the basis of the detected busy information, an output rate of the buffer.

An imaging method according to the present technology is a method including: converting, by an A/D converter, an analog signal for each color, which is output by an imaging element for a color, into a digital signal to generate raw data; generating, by a transmission processor, an IP packet storing the generated raw data; and transmitting, by a network interface, the generated IP packet to a server capable of performing development processing of the raw data, through a network.

An imaging system based on another aspect according to the present technology includes: an imaging apparatus; and a server connectable to the imaging apparatus through a network, the imaging apparatus including an imaging element for a color, an A/D converter that converts an analog signal for each color, which is output by the imaging element, into a digital signal to generate raw data, a transmission processor that generates an IP packet storing the raw data generated by the A/D converter, and a network interface that transmits the generated IP packet to the server through the network, the server including a CPI configured to perform development processing of the raw data.

Effects of the Invention

As described above, according to the present technology, it is possible to further reduce the load on the controller and to achieve the downsizing and power reduction.

MODE(S) FOR CARRYING OUT THE INVENTION

Hereinafter, embodiments according to the present technology will be described with reference to the drawings.

<First Embodiment>

[Configuration of Imaging System 10]

Figure 1:
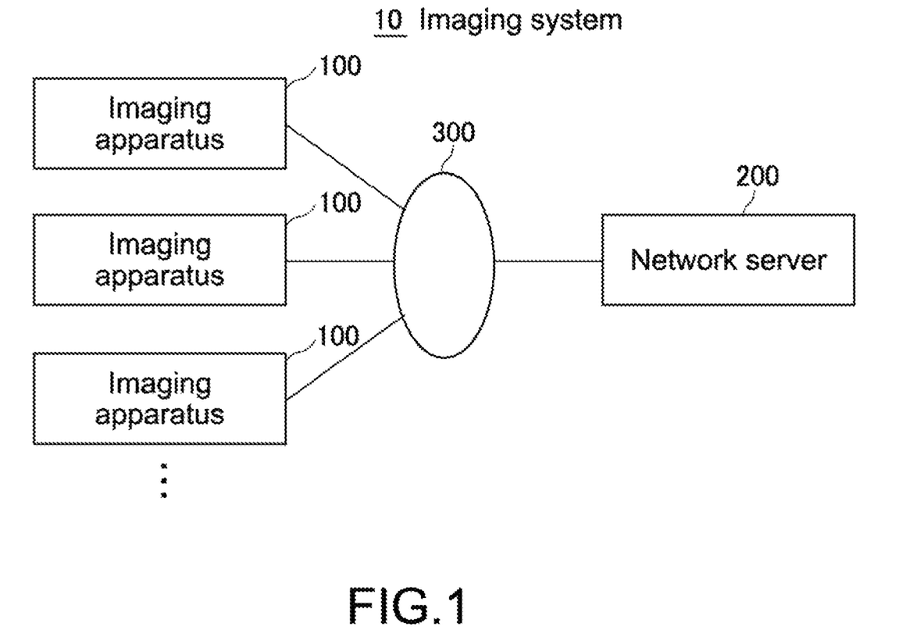
FIG. 1 is a block diagram showing an overall configuration of an imaging system 10A according to a first embodiment of the present technology.

FIG. 1 is a block diagram showing an overall configuration of an imaging system 10A according to a first embodiment of the present technology.

The imaging system 10 includes one or more imaging apparatuses 100, a network server 200, and a network 300.

In the imaging system 10, each of the imaging apparatuses 100 images an object, generates raw data from an imaging signal, and sends it to the network 300.

The network server 200 subjects the raw data sent by the imaging apparatus 100 through the network 300 to development processing, storage processing, and the like. That is, the raw data is sent from each imaging apparatus 100 to the network server 200 through the network 300.

The network 300 may be a LAN (Local Area Network), or may be a WAN (Wide Area Network), or may be the Internet. Note that a single imaging apparatus 100 may be provided. A plurality of network servers 200 may be provided to execute processing in a distributed manner.

[Configuration of Imaging Apparatus]

Figure 2:
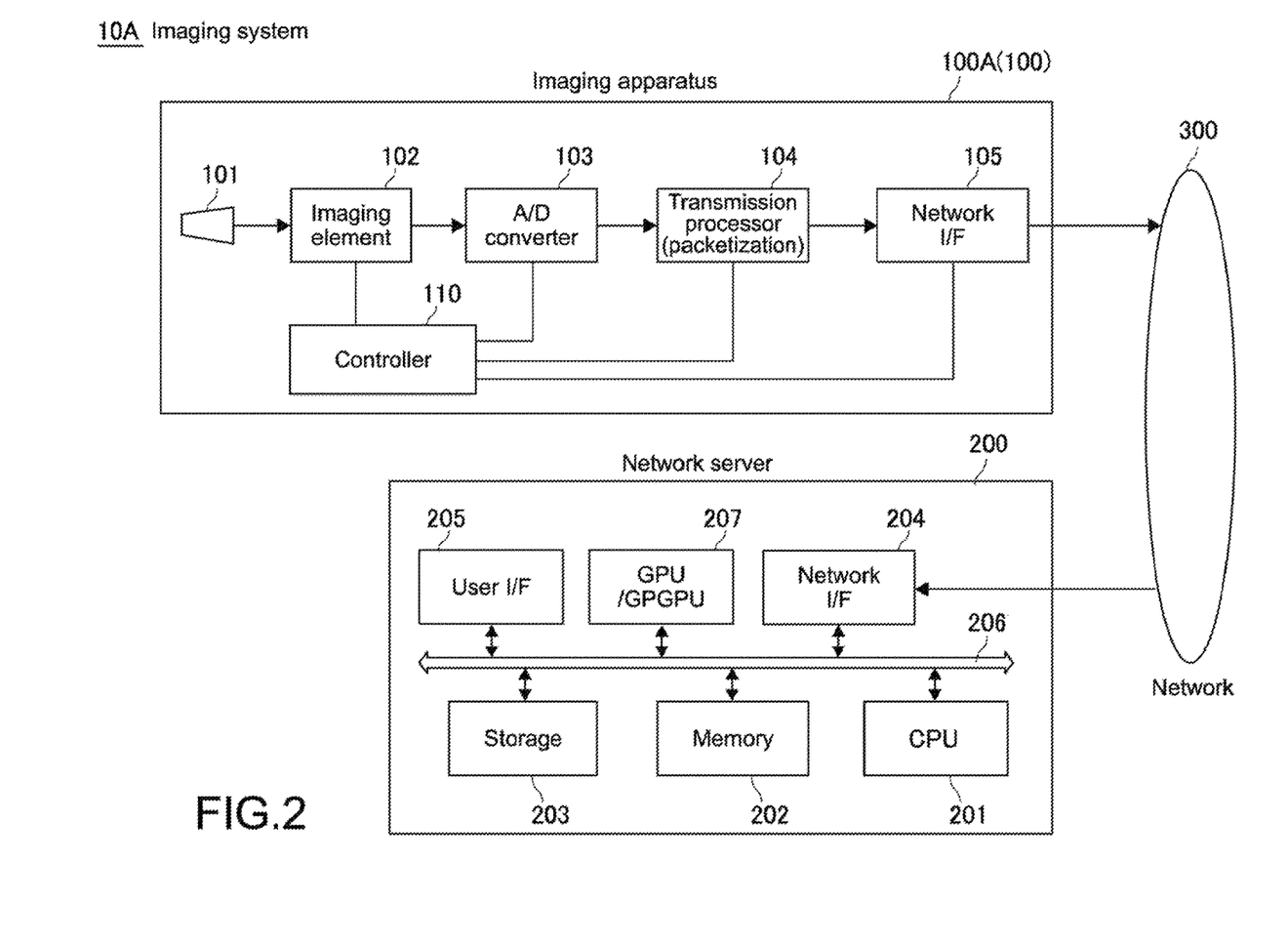
FIG. 2 A block diagram showing configurations of an imaging apparatus 100 (100A) and a network server 200 in the imaging system 10 (10A) according to the first embodiment.

FIG. 2 is a block diagram showing configurations of the imaging apparatus 100 (100A) and the network server 200 in the imaging system 10 (10A) according to the first embodiment.

Note that, in the figure, the imaging system 10 is shown as an "imaging system 10A" and the imaging apparatus 100 is shown as "an imaging apparatus 100A."

The imaging apparatus 100A includes a lens 101, an imaging element 102, an A/D converter 103, a transmission processor 104, a network interface 105, and a controller 110.

The lens 101 is a lens that forms an image from image light on an imaging surface of the imaging element 102.

The imaging element 102 converts the light into an electrical signal for each RGB according to its intensity. The imaging element 102 is, for example, a CMOS (Complementary MOS) image sensor or a CCD (Charge Coupled Device) image sensor. The imaging element 102 has, for example, a Bayer array.

The A/D converter 103 performs A/D conversion to generate, from an analog signal for each RGB, which is output from the imaging element 102, raw data having, for example, 12 bits per pixel.

The transmission processor 104 generates, from the raw data output by the A/D converter 103, a packet (IP packet) for TCP/IP (Transmission Control Protocol/Internet Protocol) network transmission. A header structure including an IP address and the like of the network server 200 specified in advance is added to this packet. An FTP (File Transfer Protocol) is used as a transfer protocol, for example.

The network interface 105 transmits the IP packet generated by the transmission processor 104 to the network server 200 through the network 300.

The controller 110 is constituted of, for example, hardware such as a CPU (Central Processing Unit) and a main memory and software such as a program. The controller 110 may be constituted of a programmable controller and the like. The controller 110 controls the imaging element 102, the A/D converter 103, the transmission processor 104, the network interface 105, and the like.

In a typical imaging apparatus (not shown), the controller also has a role of performing development processing with respect to the raw data. Therefore, the controller requires a high-speed CPU, a large-volume main memory, and the like. In contrast, in the imaging apparatus 100A according to this embodiment, the development processing with respect to the raw data is configured to be performed using a hardware resource of the network server 200 connected to the imaging apparatus 100 through the network 300. Therefore, the controller 110 of the imaging apparatus 100 does not require the high-speed CPU, the large-volume main memory, and the like for the load of the development processing. Thus, downsizing, power reduction, and cost reduction of the imaging apparatus 100 can be realized.

The network server 200 is configured by including, specifically, computer hardware such as a CPU (Central Processing Unit) 201, a memory 202, storage 203, a network interface 204, a user interface 205, and a system bus 206 and software such as an operating system and an application program for image processing including development.

The CPU 201 is capable of operating the network server 200 (computer) in the following manner by executing the application program.

1. The CPU 201 extracts raw data from an IP packet received at the network interface 204, expands it in the memory 202, and performs development processing for visualization. The term "development processing" includes at least pixel interpolation processing corresponding to an RGB-pixel array (Bayer array, etc.) of the imaging element 102 of the imaging apparatus 100. In addition to the pixel interpolation processing, various types of image adjustment such as color distortion correction, white balance adjustment, gamma correction, contrast adjustment, and sharpness processing may be performed, for example.

2. The CPU 201 performs processing for displaying visualized data (hereinafter, referred to as "picture data") on a display apparatus of the user interface 205.

3. The CPU 201 performs processing of storing the picture data in the storage 203.

4. The CPU 201 performs processing of transmitting the picture data generated by the development processing or the picture data stored in the storage 203 to another apparatus through the network 300.

The memory 202 temporarily stores software such as an operating system and an application program, raw data, and further, data being subjected to the development processing, for example.

The storage 203 is, for example, a large-volume external storage apparatus such as an HDD (Hard disk drive), an SSD (solid state drive), and a magnetic tape recorder. The storage 203 stores raw data before development and picture data after development, for example.

The network interface 204 is an interface that processes connection with the network 300.

The user interface 205 includes an input apparatus and a display apparatus. The input apparatus receives various types of instructions from a user, inputs of values of various parameters for image adjustment, and the like. The display apparatus displays a GUI (Graphical User Interface) for the development processing, and further, picture data after development, and the like. The input apparatus is specifically a keyboard, a mouse, and the like. The display apparatus is specifically a crystal display, an organic EL display, or the like.

The network server 200 may be configured by including a GPU (Graphics Processing Unit) and a GPGPU (General-purpose computing on graphics processing units) 207 for performing the development processing and the like.

[Operation of Imaging System 10A]

Next, an operation of the imaging system 10A according to this embodiment will be described.

First, in the imaging apparatus 100A, an image of image light is formed on the imaging surface of the imaging element 102 through the lens 101. The imaging element 102 outputs an analog electrical signal corresponding to the intensity of light for each RGB. The analog electrical signal from the imaging element 102 is input into the A/D converter 103.

The A/D converter 103 performs A/D conversion to generate raw data having 12 bits, for example, per pixel from the analog electrical signal from the imaging element 102 and supplies it to the transmission processor 104.

The transmission processor 104 generates a plurality of IP packets from the raw data supplied from the A/D converter 103 and sends them to the network 300. The destination of the IP packets is the network server 200.

Note that processing such as pixel defect correction and color noise correction may be performed on the raw data obtained at the A/D converter 103. That is, the raw data stored in the IP packets may be one obtained by performing certain processing on the values of individual pixels as long as it is raw data having a structure of the pixel array of the imaging element 102.

The CPU 201 of the network server 200 receives the IP packets through the network interface 204. Then, the CPU 201 of the network server 200 extracts the raw data from the received IP packets and expands it in the memory 202.

The CPU 201 of the network server 200 performs the development processing including at least the pixel interpolation processing on the raw data expanded in the memory 202. The picture data generated in this development processing is temporarily stored in the storage 203. The picture data may be displayed on the display apparatus of the user interface 205 in a real time manner.

In order to satisfactorily well continuously transmit the raw data from the imaging apparatus 100A to the network server 200 in the imaging system 10A according to this embodiment, the output rate of the A/D converter 103 and the transmission rate of the raw data have to be constantly equal. In order to satisfy such a condition, it is necessary to ensure a sufficient communication speed in the connection between the imaging apparatus 100A and the network server 200 through the network 300.

The output rate of the A/D converter 103 depends on the resolution of the imaging element 102, a frame rate, and further, the number of bits per pixel of the raw data, for example. For example, in recent years, for example, regarding required specifications of imaging apparatuses for business use (for broadcasting/cinema), the following settings have been made. Specifically, the imaging element has a horizontal resolution of 2.5 K or higher, a frame rate of 23 frames per second or higher, and 12 or more bits (12 bits, 14 bits, 16 bits, etc.) as the number of bits per pixel.

As described above, in the imaging system 10A according to this embodiment, the imaging apparatus 100A packetizes the raw data and transmits them to the network server 200 through the network 300. The network server 200 extracts the raw data from the received packets and performs development processing such as pixel interpolation. That is, the development processing at the imaging apparatus 100 becomes unnecessary, and hence the load on the controller 110 of the imaging apparatus 100 can be largely reduced and the downsizing, speed increase, and cost reduction of the imaging apparatus 100 can be achieved.

21 Second Embodiment>

Figure 3:
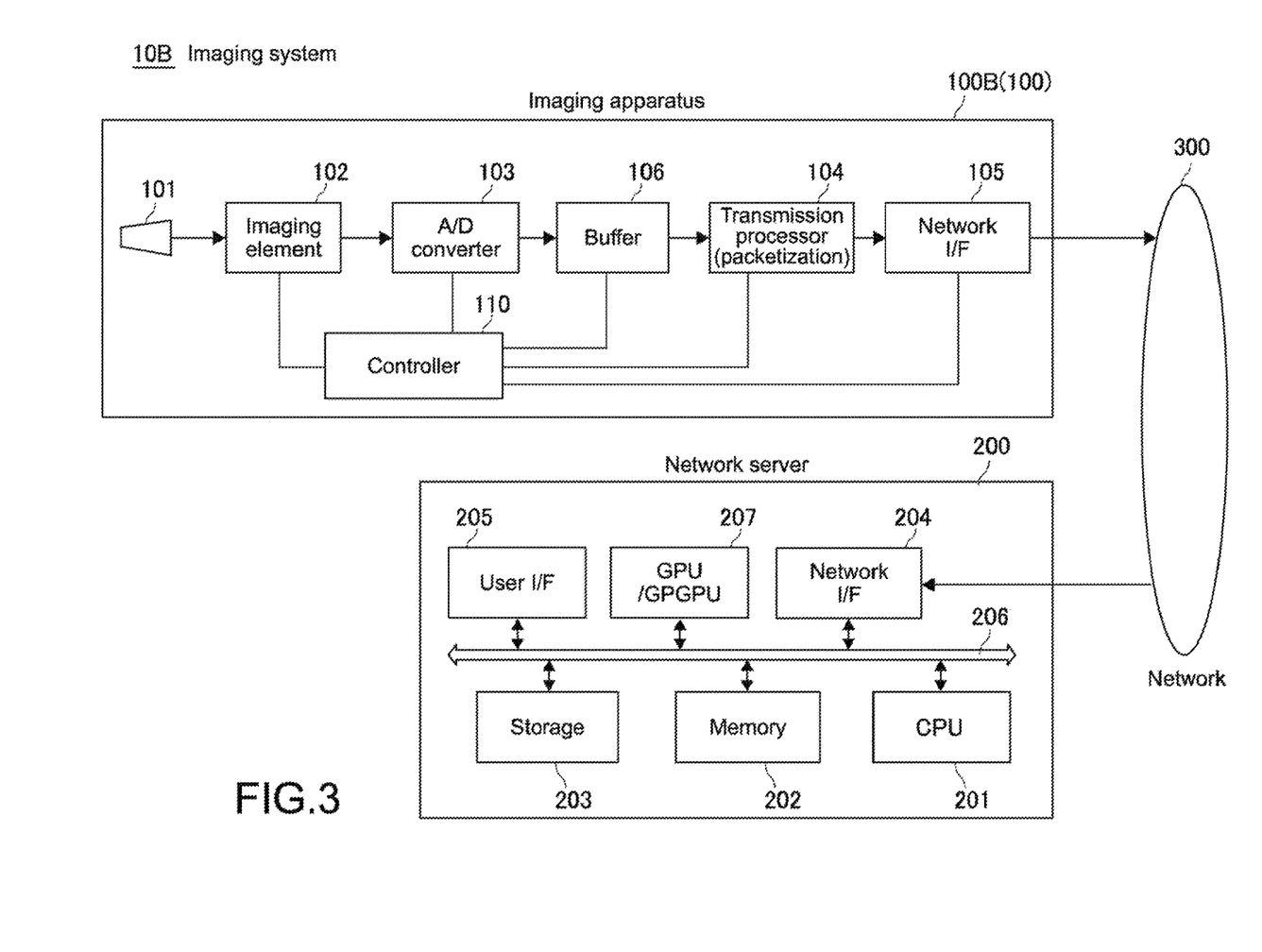
FIG. 3 A block diagram mainly showing a configuration of an imaging apparatus 100B in an imaging system 10B according to a second embodiment.

FIG. 3 is a block diagram mainly showing a configuration of the imaging apparatus 100B in the imaging system 10B according to the second embodiment. A configuration of the network server 200 is the same as that of the first embodiment. Further, the same parts of the imaging apparatus 100B as those of the imaging apparatus 100A according to the first embodiment are denoted by the same reference symbols.

The imaging system 10B according to the second embodiment is different from the imaging system 10A according to the first embodiment in that the imaging apparatus 100B includes a buffer 106 between the A/D converter 103 and the transmission processor 104. The buffer 106 is a memory for absorbing a difference between the output rate of the A/D converter 103 and the transmission rate of the raw data.

If a sufficient communication speed is not ensured between the imaging apparatus 100B and the network server 200, such a configuration in which the buffer 106 is added enables the raw data to be satisfactorily well continuously transmitted from the imaging apparatus 100B to the network server 200. For example, a lack of a picture frame after development can be prevented.

<Third Embodiment>

Figure 4:
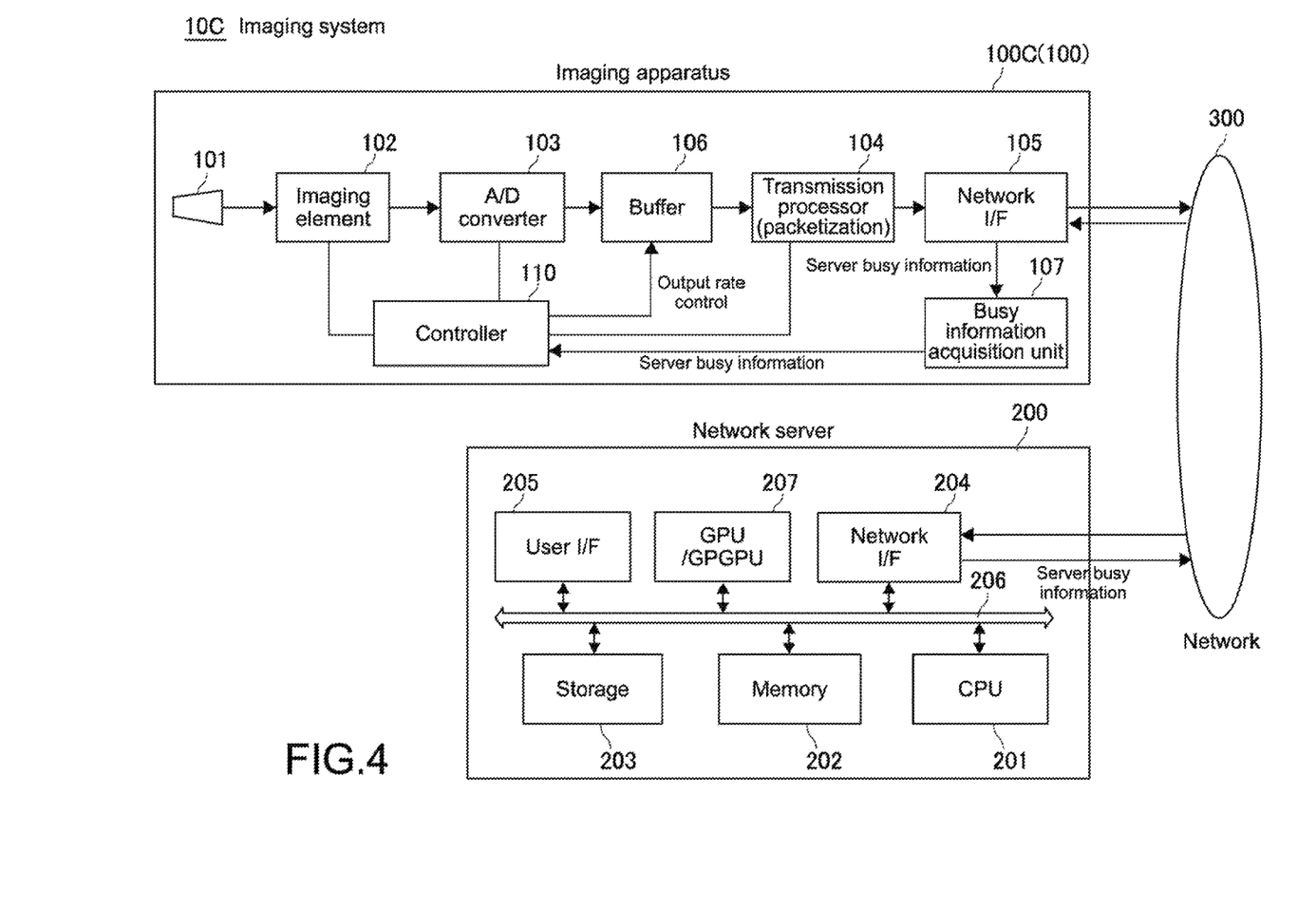
FIG. 4 A block diagram mainly showing a configuration of an imaging apparatus 100C in an imaging system 10C according to a third embodiment.

FIG. 4 is a block diagram mainly showing a configuration of an imaging apparatus 100C in the imaging system 10C according to the third embodiment. A configuration of the network server 200 is the same as that of the first embodiment. Further, in the imaging apparatus 100, the same parts as those of the imaging apparatus 100B according to the second embodiment are denoted by the same reference symbols.

The imaging apparatus 100C of the imaging system 10C includes a busy information acquisition unit 107.

The busy information acquisition unit 107 detects server busy information transmitted from the network server 200 to the imaging apparatus 100C through the network 300. When detecting the server busy information, the busy information acquisition unit 107 notifies the controller 110 of a status corresponding to the server busy information.

When receiving the status of the server busy information from the busy information acquisition unit 107, the controller controls the output rate of the raw data from the buffer 106 to be lowered.

The method of lowering the output rate of the raw data from the buffer 106 is as follows, for example.

1. A case where the server busy information takes two values of a busy state and an unbusy state will be assumed. The controller 110 stops the output from the buffer 106 in response to the busy state and performs control to restart the output in response to the unbusy state.

2. A case where the server busy information has a value quantitatively indicating the busy degree of the network server 200 will be assumed. The controller 110 stops the output from the buffer 106 for a time corresponding to the value of the busy degree. With this, the controller 110 dynamically controls the output rate from the buffer 106.

In the case where the network server 200 receives and processes packets of raw data from a plurality of imaging apparatuses 100C (see plurality of imaging apparatuses 100 in FIG. 1), the load on the CPU 201 of the network server 200 fluctuates over time. The CPU 201 of the network server 200 monitors the load, for example, the reception rate of the packets of the raw data or the number of imaging apparatuses 100C in connection. The CPU 201 generates server busy information corresponding to the detected load and performs control to respond to the imaging apparatuses 100C as transmission sources of the packets. Note that the responding control of the server busy information at the network server 200 may be replaced by various other schemes.

The CPU 201 of the network server 200 transmits the server busy information to the imaging apparatus 100C in the following case, for example.

1. When the development processing of the raw data from another imaging apparatus 100C is being executed.
2. When a free resource of the CPU 201 is equal to or smaller than a set ratio.
3. Others.

According to this embodiment, it is possible to control, according to the load condition of the network server 200, the transmission rate of the raw data from the imaging apparatus 100C to the network server 200 and temporally distribute the load of the network server 200. With this, the reliability of the imaging system 10C can be enhanced.

<Modified Example 1>

Next, a modified example of the above embodiment will be described.

Figure 5:
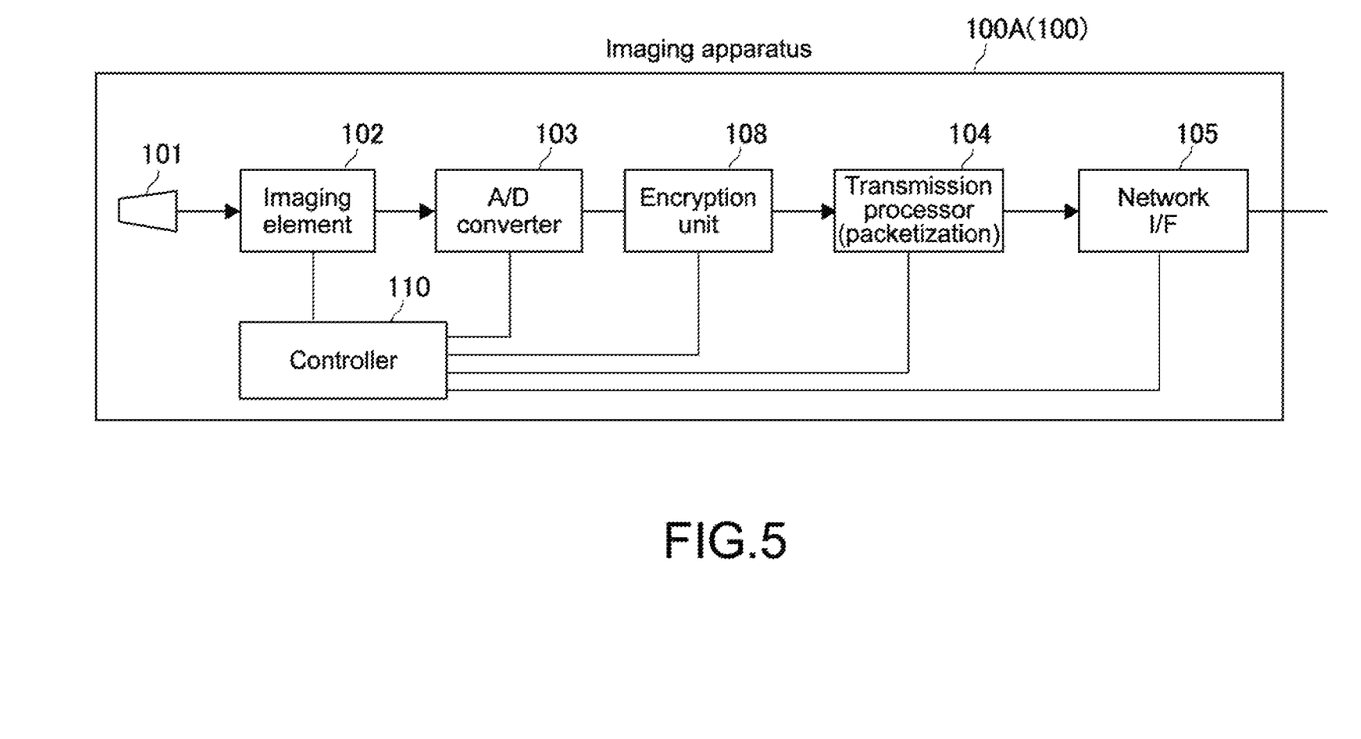
FIG. 5 A block diagram showing Modified Example 1 of the imaging apparatus 100A according to the first embodiment.
Figure 6:
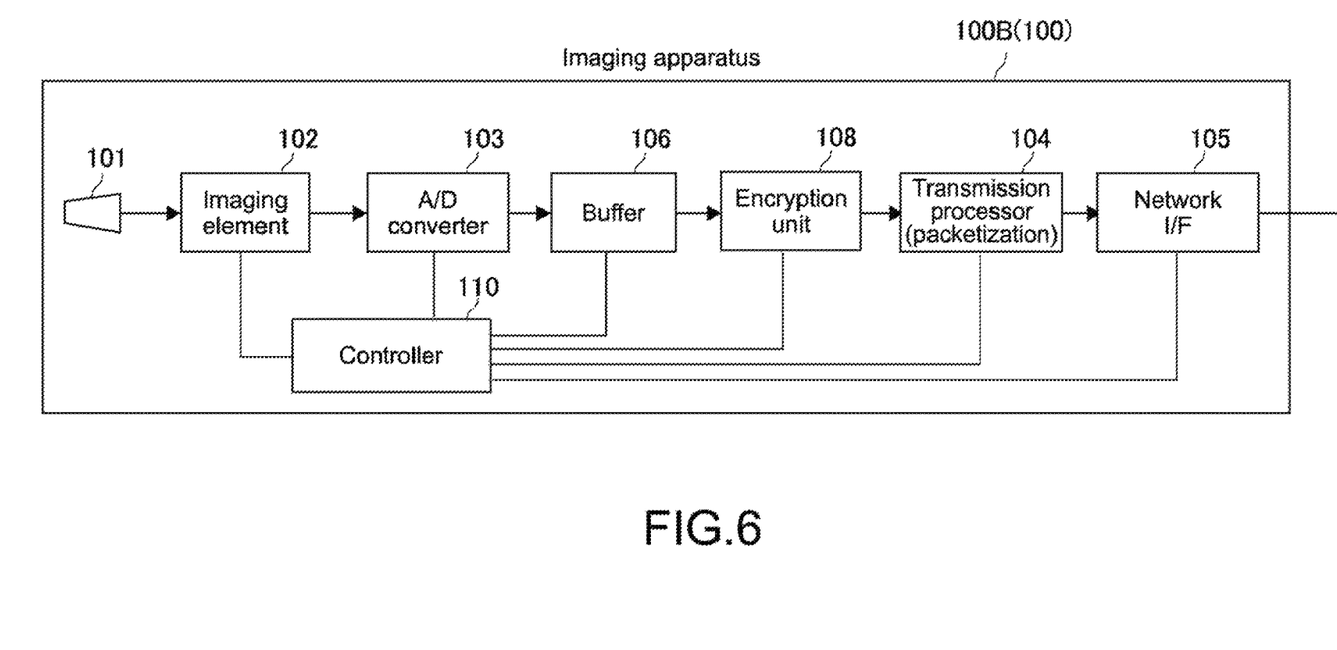
FIG. 6 A block diagram showing Modified Example 1 of the imaging apparatus 100B according to the second embodiment.
Figure 7:
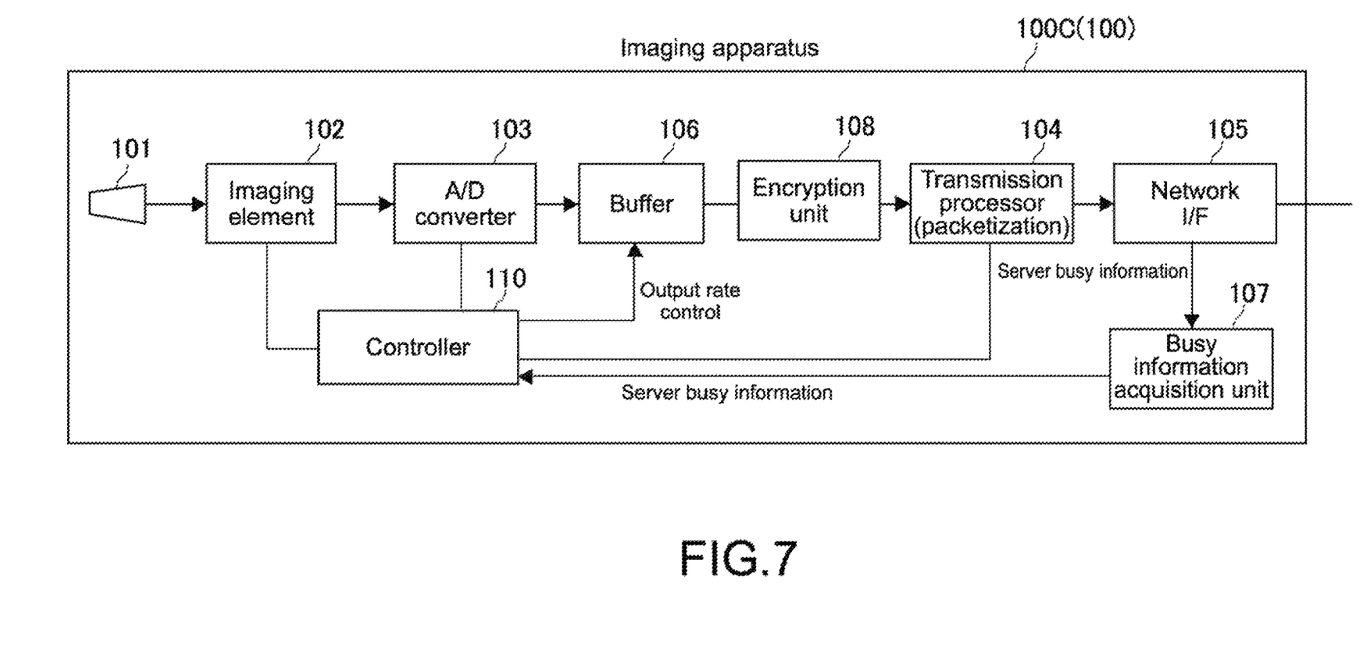
FIG. 7 A block diagram showing Modified Example 1 of the imaging apparatus 100C according to the third embodiment.

FIGS. 5, 6, and 7 are block diagrams showing Modified Examples 1 of the imaging apparatuses 100A, 100B, and 100C according to the first to third embodiments above.

As shown in FIGS. 5, 6, and 7, in these Modified Example 1, an encryption unit 108 that encrypts the raw data is provided before packetization of the raw data. For encrypting the raw data, for example, a DES (Data Encryption Standard: standard encryption), an AES (Advanced Encryption Standard: common-key cryptography), or a public-key cryptography may be used.

With this, it is possible to prevent wiretapping and the like of the raw data from the network 300 and enhance the reliability.

<Modified Example 2>

Figure 8:
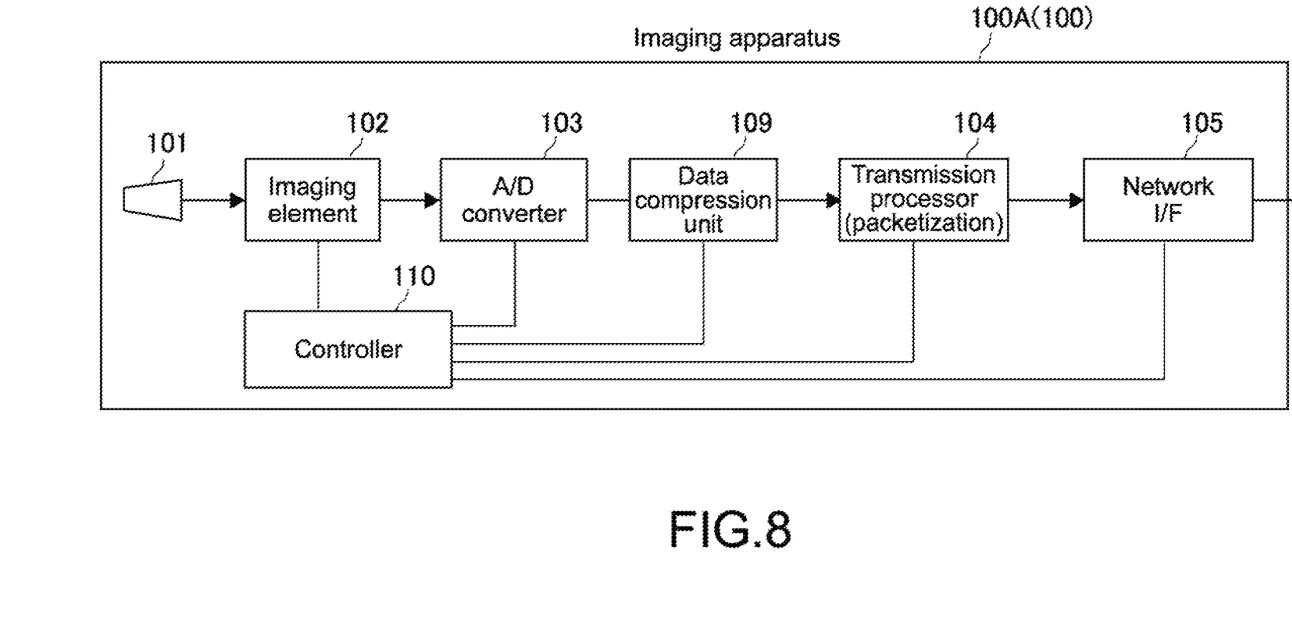
FIG. 8 A block diagram showing Modified Example 2 of the imaging apparatus 100A according to the first embodiment.
Figure 9:
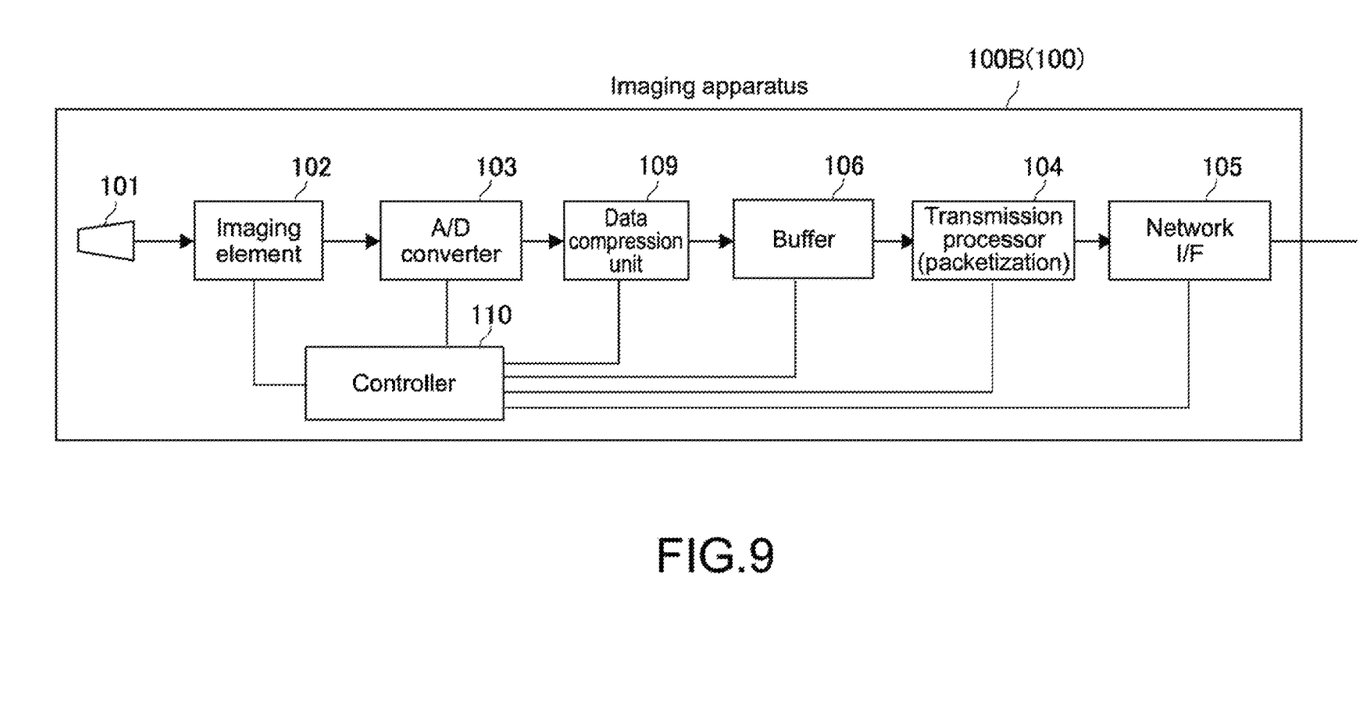
FIG. 9 A block diagram showing Modified Example 2 of the imaging apparatus 100B according to the second embodiment.
Figure 10:
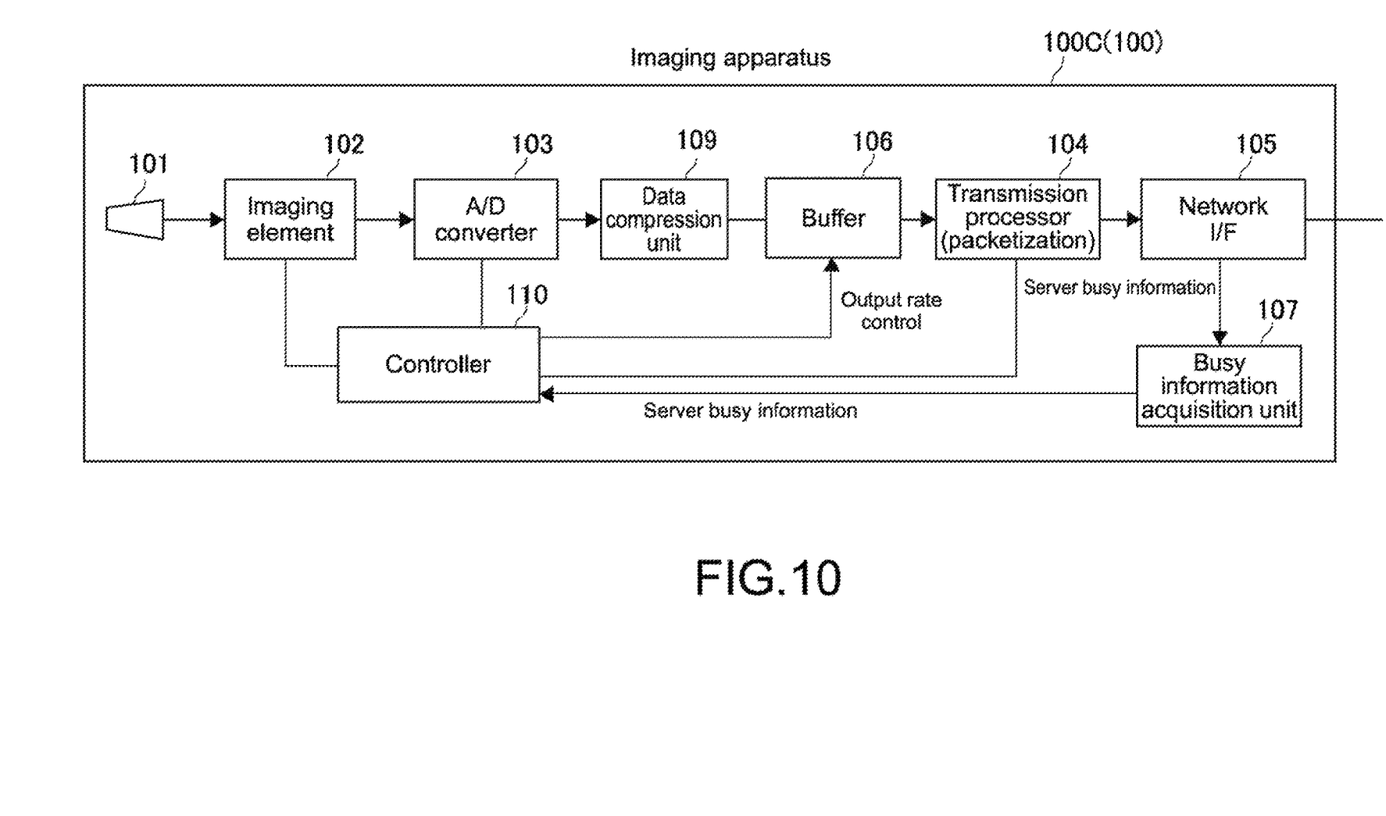
FIG. 10 A block diagram showing Modified Example 2 of the imaging apparatus 100C according to the third embodiment.

FIGS. 8, 9, and 10 are block diagrams showing Modified Examples 2 of the imaging apparatuses 100A, 100B, and 100C of the above first to third embodiments.

As shown in FIGS. 8, 9, and 10, in these Modified Examples 2, a data compression unit 109 that compresses the raw data output by the A/D converter 103 is provided. For compressing the raw data, for example, MPEG-2 (MPEG: Moving Picture Experts Group), AVC, XAVC, or JPEG2000 (JPEG: Joint Photographic Experts Group) can be used.

With this, it is possible to reduce the transmission amount of the raw data. Further, it is possible to reduce the size of the buffer 106.

<Modified Example 3>

Figure 11:
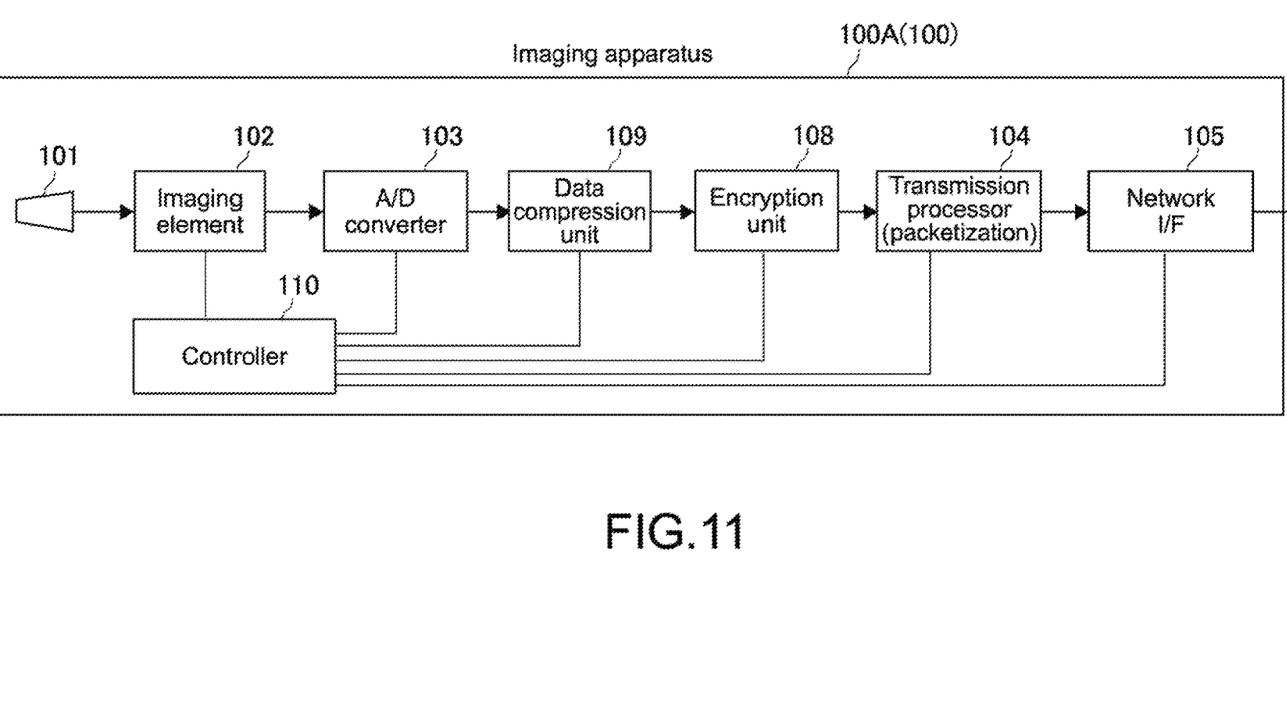
FIG. 11 A block diagram showing Modified Example 3 of the imaging apparatus 100A according to the first embodiment.
Figure 12:
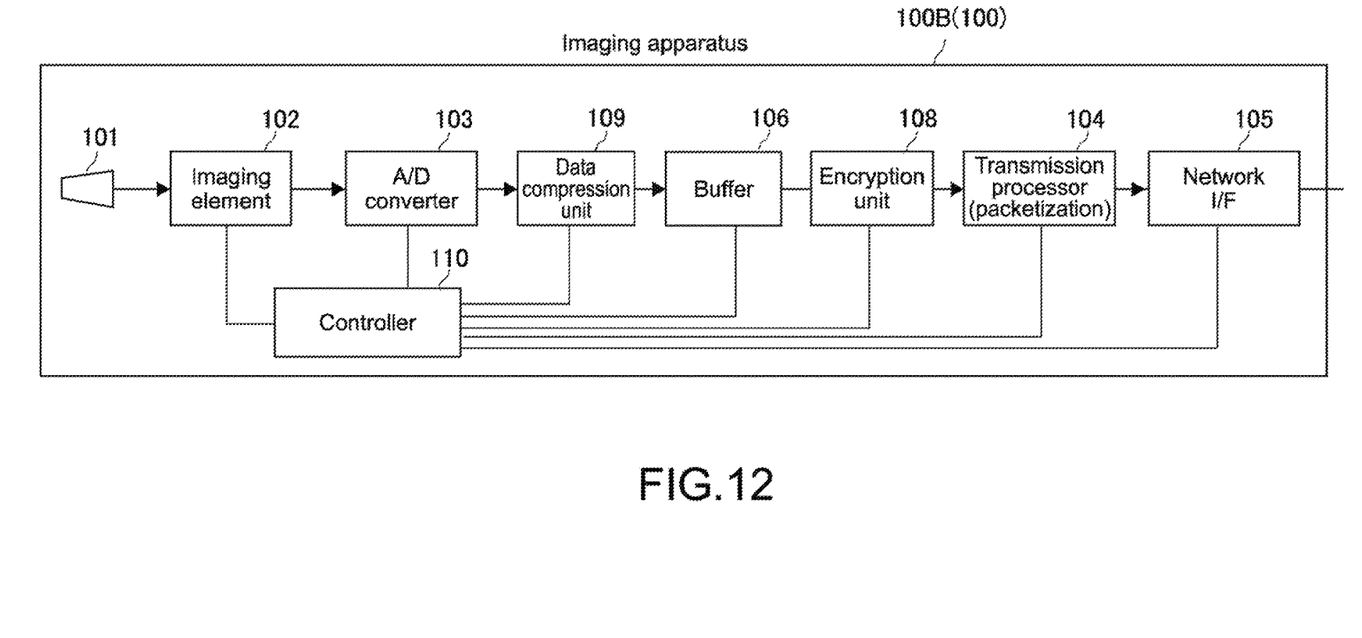
FIG. 12 A block diagram showing Modified Example 3 of the imaging apparatus 100B according to the second embodiment.
Figure 13:
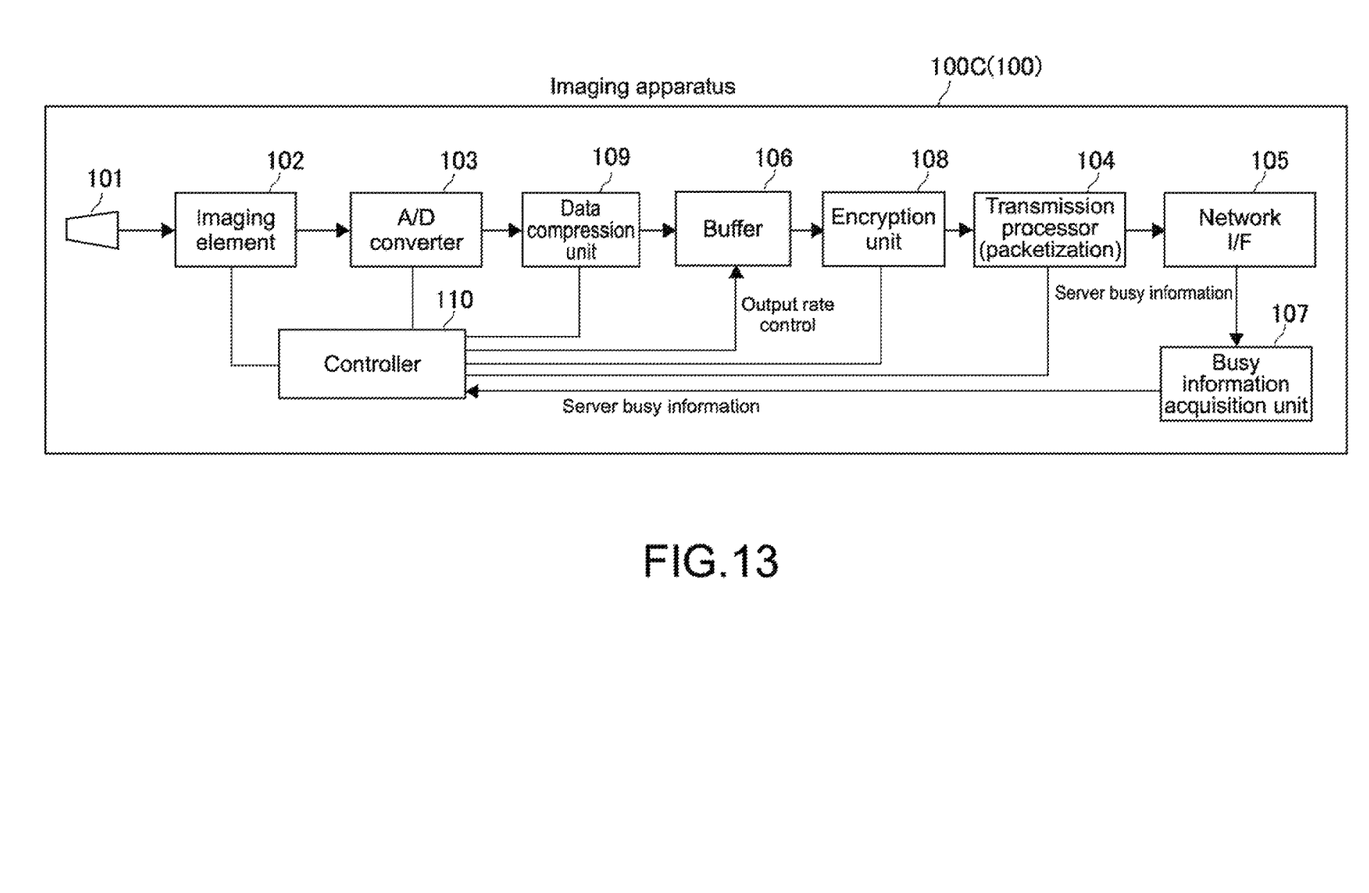
FIG. 13 A block diagram showing Modified Example 3 of the imaging apparatus 100C according to the third embodiment.

FIGS. 11, 12, and 13 are block diagrams showing Modified Examples 2 of the imaging apparatuses 100A, 100B, and 100C of the above first to third embodiments.

As shown in FIGS. 11, 12, and 13, in these Modified Examples 2, the data compression unit 109 that compresses the raw data output by the A/D converter 103 and the encryption unit 108 that encrypts the compressed raw data are provided.

With this, it is possible to prevent wiretapping and the like of the raw data from the network 300 and enhance the reliability. Further, it is possible to reduce the transmission amount of the raw data. In addition, it is possible to reduce the size of the buffer 106.

Note that, in the imaging apparatuses 100B and 100C in FIGS. 12 and 13, the data compression unit 109 may be disposed on the output side of the encryption unit 108.

Note that the present technology may also take the following configurations.

(1) An imaging apparatus, including:
an imaging element for a color;
an A/D converter that converts an analog signal for each color, which is output by the imaging element, into a digital signal to generate raw data;
a transmission processor that generates an IP packet storing the raw data generated by the A/D converter; and
a network interface that transmits the generated IP packet to a server capable of performing development processing of the raw data, through a network.

(2) The imaging apparatus according to (1), further including
a buffer that buffers the raw data generated by the A/D converter.

(3) The imaging apparatus according to (2), further including:
a busy information acquisition unit that acquires busy information indicating a busy state of the server, which is transmitted from the server; and
a controller that changes, on the basis of the detected busy information, an output rate of the buffer.

(4) The imaging apparatus according to any one of (1) to (3), in which
the imaging element has a horizontal resolution of 2.5 K or higher.

(5) The imaging apparatus according to any one of (1) to (4), in which
the raw data has a frame rate of 23 frames per second or higher.

(6) The imaging apparatus according to any one of (1) to (5), in which
the raw data has 12 or more bits as the number of bits per pixel.

(7) The imaging apparatus according to any one of (1) to (6), further including
a compression unit that compresses the raw data,
in which the transmission processor generates an IP packet storing the compressed raw data.

(8) The imaging apparatus according to any one of (1) to (6), further including
an encryption unit that encrypts the raw data,
in which the transmission processor generates an IP packet storing the encrypted raw data.

(9) The imaging apparatus according to any one of (1) to (6), further including:
a compression unit that compresses the raw data; and
an encryption unit that encrypts the raw data,
in which the transmission processor generates an IP packet storing the compressed and encrypted raw data.

DESCRIPTION OF REFERENCE NUMERALS

10 imaging system
100 imaging apparatus
101 lens
102 imaging element
103 A/D converter
104 transmission processor
105 network interface
106 buffer
107 busy information acquisition unit
108 encryption unit
109 data compression unit
110 controller
200 network server 201 CPU
300 network

The invention claimed is:

1. An imaging apparatus, comprising:
an imaging element configured to output an analog signal for a color;
an A/D converter configured to:
  convert the analog signal for the color into a digital signal; and
  generate raw data based on the conversion of the analog signal;
a buffer configured to store the generated raw data;
a transmission processor configured to generate an IP packet based on the generated raw data stored in the buffer; and
a network interface configured to transmit, through a network, the generated IP packet to a server
for a development processing operation on the raw data;
a busy information acquisition unit configured to acquire busy information from the server,
wherein the busy information indicates a busy state of the server; and
a controller configured to change an output rate of the buffer based on the busy information.

2. The imaging apparatus according to claim 1, wherein the imaging element has a horizontal resolution of at least 2.5 K.

3. The imaging apparatus according to claim 2, wherein the raw data has a frame rate of at least 23 frames per second.

4. The imaging apparatus according to claim 3, wherein the raw data has at least 12 bits as a number of bits per pixel.

5. The imaging apparatus according to claim 1, further comprising
a compression unit configured to compress the raw data,
wherein the transmission processor is further configured to generate the IP packet that stores the compressed raw data.

6. The imaging apparatus according to claim 1, further comprising
an encryption unit configured to encrypt the raw data,
wherein the transmission processor is further configured to generate the IP packet that stores the encrypted raw data.

7. The imaging apparatus according to claim 1, further comprising:
a compression unit configured to compress the raw data; and
an encryption unit configured to encrypt the compressed raw data,
wherein the transmission processor is further configured to generate the IP packet that stores the encrypted raw data.

8. The imaging apparatus according to claim 3, further comprising:
a compression unit configured to compress the raw data; and
an encryption unit configured to encrypt the compressed raw data,
wherein the transmission processor is further configured to generate the IP packet that stores the encrypted raw data.

9. An imaging method, comprising:
outputting, by an imaging element, an analog signal for a color;
converting, by an A/D converter, the analog signal for the color into a digital signal;
generating, by the A/D converter, raw data based on the conversion of the analog signal;
storing, by a buffer, the generated raw data;
generating, by a transmission processor, an IP packet based on the generated raw data stored in the buffer;
transmitting, by a network interface, the generated IP packet to a server through a network
for a development processing operation on the raw data;
acquiring, by a busy information acquisition unit, busy information from the server
wherein the busy information indicates a busy state of the server; and
changing, by a controller, an output rate of the buffer based on the busy information.

10. An imaging system, comprising:
an imaging apparatus; and
a server configured to communicate with the imaging apparatus through a network, wherein the imaging apparatus includes:
  an imaging element configured to output an analog signal for a color;
  an A/D converter configured to:
    convert the analog signal for the color into a digital signal; and
    generate raw data based on the conversion of the analog signal;
  a buffer configured to store the generated raw data;
  a transmission processor configured to generate an IP packet based on the generated raw data stored in the buffer;
  a network interface configured to transmit the generated IP packet to the server through the network;
  a busy information acquisition unit configured to acquire busy information from the server,
  wherein the busy information indicates a busy state of the server; and
  a controller configured to change an output rate of the buffer based on the busy information,
wherein the server includes a central processing unit (CPU) configured to execute a development processing operation on the raw data.

* * * * *